United States Patent Office 3,663,484
Patented May 16, 1972

3,663,484
METHOD FOR MANUFACTURING WATER-DILUTABLE, VINYL MODIFIED SYNTHETIC RESINS BASED ON POLYETHER ESTERS
Bernhard Broecker, Hamburg, Germany, assignor to Reichhold-Albert-Chemie Aktiengesellschaft, Hamburg, Germany
No Drawing. Filed June 11, 1970, Ser. No. 45,601
Claims priority, application Switzerland, June 11, 1969, 8,326/69; Jan. 30, 1970, 1,325/70; Mar. 31, 1970, 4,712/70
Int. Cl. C09d 3/58; C23b 13/00
U.S. Cl. 260—19 EP          31 Claims

ABSTRACT OF THE DISCLOSURE

Water-dilutable, vinyl modified synthetic resins based on polyetheresters which are reaction products of (a) compounds carrying epoxy groups and possibly also hydroxyl groups, etherified with (b) monovalent alcohols with 3–20 C atoms, having at least one and preferably several ethylenic double bonds, by heating, then esterified with (c) the etherification products with aliphatic monocarboxylic acids with 6–20 C atoms, containing preferably one or more ethylenic double bonds, thereafter (d) reacted with such amounts of $\alpha,\beta$-ethylenically unsaturated mono or polycarboxylic acids possibly in the presence of other vinyl or vinylidene compounds, by heating, so that the reaction products have an acid number of at least 25, and (e) mixed with such amounts of ammonia and/or strong organic nitrogen bases up to complete or partial neutralization, until the reaction products are sufficiently dispersible of water-dilutable.

Preferred are the polyetheresters of this invention, usable for the manufacture of electrophoretically depositable synthetic binders, which are obtained when the new polyetheresters are mixed together with phenoplasts and/or aminoplasts before the neutralization with ammonia or amines and are subjected to a precondensation by heating to temperatures of 100° to 150° C., the heating of the mixture being interrupted immediately if the formed precondensate has reached the necessary acid number.

BACKGROUND OF THE INVENTION

Description of the prior art

Swiss Pats. Nos. 456,814 and 466,850 describe water diluable stoving enamels manufactured by reacting epoxy-free reaction products of epihalohydrines and polyphenols with anhydrides of bi- or multivalent organic acids. However, here the carboxyl groups necessary for the solubility in water, are not introduced by polymerization but by esterification. According to the invention, however, the products contain the carboxyl gorups in polymerized form which leads to a substantial improvement of the saponification strength.

U.S. Patent No. 3,293,201 described a water soluble, air drying bonding agent, produced by reacting an oil-maleic acid anhydride adduct with the ester of an epoxy resin with an unsaturated fatty acid. Also this product has insufficient stability in an alkaline, aqueous solution. On the other hand, the synthetic resins according to the invention are characterized by a very high stability in aqueous alkaline solution.

Field of the invention

The present invention relates to the manufacture of water-soluble, vinyl modified synthetic resins based on polyetheresters. Known synthetic resins which are diluable in water have the drawback that they are not stable for storage in aqueous solution. The pH value of neutralized products slides during storage into the acid zone, giving rise to the formation of components which are insoluble in water.

It is the object of the invention to provide such water-soluble synthetic resins which are characterized by excellent stability in an alkaline environment and which can be manufactured comparatively cheaply.

SUMMARY OF THE INVENTION

The invention relates to a method for manufacturing water diluable, vinyl modified synthetic resins, based on polyetheresters, characterized in that:

(a) Compounds carrying epoxy groups and possibly additional hydroxy groups, and having the general formula:

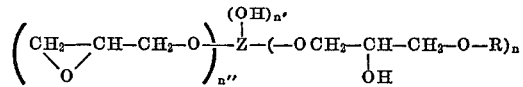

wherein R is an alkyl radical having 1 to 6 carbon atoms, (I) Z is a monovalent or polyvalent hydrocarbyl radical e.g., an alkyl or alkylene, aryl or arylene, cycloalkyl or cycloalkylene radical, $n'$ is zero, $n''$ is 1, 2 or 3, and $n$ is 0, 1 or 2; or (II) Z is an alkylene, arylene, cycloalkylene radical, $n'$ and $n''$ are 1, and $n$ is 0, 1 or 2; or (III) Z is a radical with the formula

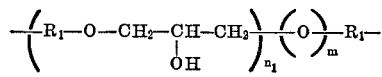

where $n$ and $n'$ are zero, and $n''$ is 2, $R_1$ is an aliphatic or aromatic hydrocarbon radical, $n_1$ is zero or a small number between 1 and 5, and $m$ is zero or 1, with proviso that when $n_1$ is zero $m$ is zero and when $n_1$ is greater than zero $m$ is 1.

(b) etherified with monovalent alcohols with 3 to 20 carbon atoms, having at least one and preferably several ethylenic double bonds, by heating, possibly in the presence of catalysts; and thereafter (c) esterifying the etherification products with aliphatic monocarboxylic acids with 6–20 C atoms, containing preferably one or more ethylenic double bonds, either individually or in mixture; and (d) reacting by heating the esterification products with such amounts of $\alpha,\beta$-ethylenically unsaturated mono and/or polycarboxylic acids and, insofar as existent, their anhydrides and/or their semiesters with monoalcohols with 1 to 4 C atoms, possibly in the presence of other vinyl or vinylidene compounds so that the reaction products have at least an acid number of 25; and (e) then mixing the reaction products containing carboxyl groups with such amounts of ammonia and/or strong organic nitrogen bases until complete or partial neutralization has been obtained, until the reaction products are dispersible in or dilutable with water.

DESCRIPTION OF THE PREFERRED EMBODIMENT

Suitable compounds with epoxy groups, and possibly containing additional hydroxyl groups, for building up the reaction products, are epoxidized olefins, diolefins, and oligo-olefins such as 1,2,5,6-diepoxyhexane and 1,2,4,5-diepoxyhexane. Very suitable are polyethers with epoxy groups such as may be produced by etherification of a bivalent alcohol or diphenol with epihalohydrins or dihalohydrins, e.g., epichlorohydrin or dichlorohydrin in the presence of alkali. These compounds are derived from glycols, such as ethylene glycol, diethylene glycol, triethylene glycol, propylene glycol-1,2, propylene glycol-1,3, butylene glycol-1,4, pentane diol-1,5, hexane diol-1,6, and especially diphenols, such as resorcinol, pyrocatechinol, hydroquinone, 1,4-dihydroxy-naphthaline, bis-(4-hydroxy-phenyl-) methane, bis-4-(hydroxy-phenyl)-methyl-phenylmethane, bis-(4-hydroxy-phenyl-tolyl)-methane, 4,4-dihydroxy-diphenyl and 2,2-bis-(4-hydroxy-phenyl)-propane. The compounds in the form of polyethers, and containing epoxy groups, have the following formula:

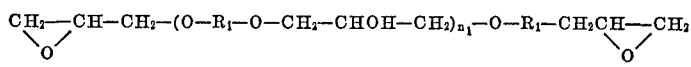

In this formula $R_1$ is an aliphatic or aromatic hydrocarbon radical and $n_1$ is zero or a small number, e.g., 1 to 5.

Of particular interest are polyethers containing epoxy groups and having the following general formula:

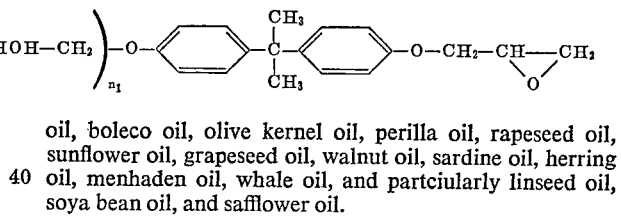

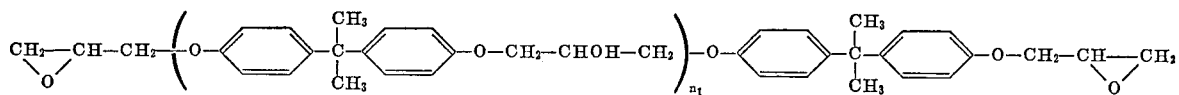

based on 2,2-bis-(4-hydroxy-phenyl)-propane as starting compounds, and of which polyethers with a molecular weight of between about 380 and 3500 are preferred.

For the etherification of these compounds containing epoxy groups, monoalcohols are used which have at least one ethylenic double bond. However, preferably, alcohols with several ethylenic double bonds are used, and in the preferred arrangement at least a part of these double bonds are conjugated.

Suitable alcohols with ethylenic double bonds are, e.g., allyl alcohol, allyloxypropanol, geraniol, farnesol, soya oil alcohol, linseed oil alcohol, and similar alcohols with 3 to 20 carbon atoms.

The etherification is effected by heating, preferably in the presence of catalysts, in a manner such that the hydroxyl groups of the unsaturated monoalcohols are always present in excess over the epoxy groups of the compounds containing epoxy groups. If the unsaturated monoalcohols are volatile, it is recommended to operate with a very substantial excess (of up to 20 hydroxyl groups per epoxy group) and to remove the excess of untransformed unsaturated alcohol subsequently, e.g., by distillation. In the case of nonvolatile unsaturated alcohols, the excess is preferably lower, but at least 1.2 hydroxyl groups should be used per epoxy group. Although it is, in principle, possible to work with quantity ratios between unsaturated alcohols and compounds having epoxy groups, in which one epoxy group is used per hydroxyl group of the unsaturated monoalcohol, and possibly the epoxy groups can be present to excess relative to the hydroxyl groups, of the unsaturated monoalcohol. However, in the last mentioned case, very highly viscous products are obtained and the risk of gelling of the resins cannot be reliably prevented.

The etherification is effected by heating the said components (a) and (b) to temperatures of about 40–150° C., the range between 60 and 120° C. being preferred. Working with etherification catalysts is also preferred. Suitable compounds for this purpose are, e.g., borotrifluoride adducts, e.g., borotrifluoride diethyl ether, organic tin compounds such as dibutyl tin laurate, and strong organic bases, e.g., trimethylbenzyl ammoniumhydroxide.

The etherification products obtained by this reaction must be soluble in organic solvents, such as methyl isobutyl ketone, xylene, toluene, glycol ether, such as butyl glycol, isobutyl glycol. The etherification may be carried out in the absence of organic solvents, but the presence of inert organic solvents is permissible.

The polyethers obtained in this manner are then esterified with aliphatic monocarboxylic acids with 6–20 C atoms, containing preferably one or more ethylenic double bonds. Suitable aliphatic monocarboxylic acids are saturated fatty acids which may be branched or not, such as caprylic acid, pelargonic acid, cocinic acid, stearic acid, isononanic acid, straight-chain unsaturated fatty acids with 10–20 C atoms, such as palmitoleic acid, petroselic acid, oleic acid, elaidic acid, 9,12-linoleic acid, 9,11-linoleic acid (as cis, cis-trans and trans-trans acid), linolenic acid, eleostearic acid, lignoceric acid, arachidonic acid, clupadonic acid α-parinaric acid, α-licanic acid or their anhydrides, alone or in mixtures. Preferably fatty acid mixtures are used such as are obtained from natural animal or vegetable fats, such as cottonseed oil, groundnut oil, wood oil, corn oil, oiticica oil, olive oil, poppyseed oil, boleco oil, olive kernel oil, perilla oil, rapeseed oil, sunflower oil, grapeseed oil, walnut oil, sardine oil, herring oil, menhaden oil, whale oil, and partciularly linseed oil, soya bean oil, and safflower oil.

It is also possible to use technical fatty acids, especially tall oil fatty acids, chemically treated fatty acids or fatty acids of chemically treated fats, especially dehydrated castor oil fatty acids, or conjugated fatty acids treated by catalytic methods, fatty acids from catalytically conjugated fats, especially conjugated linseed oil, soya bean oil, saffower oil fatty acids, catalytically elaidinated fatty acids or fatty acids from elaidinated fats, partially hydrogenated fatty acids or fatty acids of partially hydrogenated fats, e.g. partially hydrogenated fish oils, or mixtures of such acids or acid mixtures of the type mentioned hereinbefore, as well as fatty acid mixtures, containing as admixture resin acids, especially rosins, tall rosin acids, especially colopheny and/or partially hydrogenated resin acids, especially partially hydrogenated colopheny alone or in mixture.

Excellent results are obtained with so-called technical linolic acids, obtained by distillation and characterized by a high linolic acid content (above 50 weight-percent) and very low linolenic acid content (below 2 weight-percent) and saturated fatty acid content (below 10 weight-percent).

The esterification is effected by heating, and the removal of the water of reaction may be accelerated by adding dragging agents, such as xylene, toluene, benzol or by working at reduced pressure. The esterification takes place in the presence of Friedel-Crafts catalysts, e.g., borotrifluoride or in the presence of organic tin compounds, e.g., dibutyl tin laurate. The amount of monocarboxylic acids is so selected that the equivalency ratio between the carboxyl groups of the monocarboxylic acids and the hydroxyl groups of the epoxy resin ether is 0.5 to 0.9. The esterification is continued until the acid number reached about 5.

The fatty acid content of the end product should not be below 20% w./w. and should not exceed 60% w./w.; the preferred range is between 25 and 55% by weight.

The polyethers obtained are then copolymerized under heat with α,β-ethylenically unsaturated moncarboxylic and/or polycarboxylic acids. The copolymerization may also be effected in mixture with other vinyl or vinylidene monomers which have no carboxyl groups. Copolymerizable vinyl monomers without carboxyl groups comprise the following: alkyl esters of α,β-unsaturated monocarboxylic acids, such as methyl acrylate, ethyl acrylate, propyl acrylate, butyl acrylate, octyl acrylate, 2-ethylhexyl acrylate, decyl acrylate, lauryl acrylate, and the corresponding methyl, ethyl, phenyl acrylates, propyl crotonate, butyl crotonate, and the like. Other compounds are: hydroxyalkyl esters of α,β-unsaturated carboxylic acids, such as 2-hydroxyethyl acrylate, 2-hydroxypropyl acrylate, 2-hydroxybutyl acrylate, 3-hydroxybutyl acrylate, 6-hydroxyhexyl acrylate, and the corresponding methacrylates, ethacrylates, phenyl acrylates, 2-hydroxyl ethyl maleinate, di-(2-hydroxypropyl)-maleinate and the corresponding fumarates, 2-hydroxy-3-butoxypropyl acrylate and the corresponding ethacrylates and phenyl acrylates, but also other copolymerizable vinyl and vinylidene compounds, such as styrene, nucleus-substituted styrenes, styrenes substituted in the side chain, such as α-methyl styrene, α-ethyl styrene, α-chlorostyrene are suitable. The following monomers are preferred: methyl acrylate methyl methacrylate, ethyl acrylate, ethyl methacrylate, 2-hydroxyethyl acrylate, 2-hydroxypropyl acrylate, as well as styrene, α-methyl styrene and vinyl toluene, either alone or in mixture.

Suitable copolymerizable monomers containing carboxyl groups are: acrylic acid, methacrylic acid, cinnamic acid, α-benzoylacrylic acid, crotonic acid; also α,β-ethylenically unsaturated polycarboxylic acids or their anhydrides insofar as such are formed, such as maleic acid, fumaric acid, citraconic acid, itaconic acid, methaconic acid, aconitic acid or monoesters of the said polycarboxylic acids with saturated, straight-chain monoalcohols with 1–4 C atoms, preferably methanol, maleic monomethyl ester, halogen-substituted acids, such as chloromaleic acid and the like. Amongst the preferred α,β-ethylenically unsaturated carboxylic acids are: acrylic acid, methacrylic acid, maleic acid anhydride, maleic acid and fumaric acid.

The carboxyl carrying polymerizable monomers may be brought to reaction either alone in mixture with each other, alone in mixture with the first-named monomers containing no carboxyl groups, or in mixture therewith, with the ether ester of stage (c).

As admixtures it is possible to add to the monomer mixture, either individually or in mixture, other polymerizable monomers, such as acryl amide, methacryl amide, acrylonitrile, methacrylonitrile and the like. The vinyl or vinylidene portion in the synthetic resin depends on the intended range of use of the binder. However, it should not be below 10% w./w. related to the weight of the end product. For paint varnishing or coating agents, applied by electrophoresis, end products are especially suitable which contain 10 to 30% w./w. of vinyl and/or vinylidene compounds in polymerized form. With such binders, it should be noted that the copolymerization with the polymerizable monomers is complete. With excessive residual proportions of monomers, difficulties might arise with regard to the separation and the compatibility with pigments. Binders containing 30–50% w./w. of copolymerized vinyl or vinylidene compounds are particularly suitable for air drying coatings. If the copolymerization is carried out with α,β-ethylenically unsaturated monocarboxylic acids, the use of larger proportions of vinyl or vinylidene compounds without carboxyl groups is to be preferred. The proportion of α,β-unsaturated monocarboxylic acids should not generally exceed 30% w./w., related to the monomer mixture, because otherwise the formed products tend to gel and precipitations tend to form easily during the manufacture.

During the copolymerization of α,β-unsaturated dicarboxylic acids or their partial esters, the reaction may be carried out satisfactorily also without the use of vinyl and/or vinylidene compounds without carboxyl groups. However, preferably, especially with the use of dicarboxylic acids which are comparatively strong acids, i.e., have pK values of below 4, prior to the reaction with polyethers, all hydroxyl groups of the polyester are blocked, because otherwise an esterification during the copolymerization cannot be excluded. This blocking of the hydroxyl groups may be effected by reaction with acid anhydrides, such as acetanhydride and the like, or by reaction with mono and/or polyisocyanates, e.g., toluene diisocyanates, which easily react with hydroxyl groups. With the use of weaker α,β-ethylenically unsaturated carboxylic acid, this danger does not exist. The reaction of polyetheresters with the carboxyl group containing monomers for the purpose of polymerization is effected under heat, preferably in the presence of polymerization catalysts. The reaction temperatures depend on the catalytic system used. Optimum ranges are reaction temperatures between 120° to 180° C., using di-tert.butyl peroxide, eventually in combination with chain disintegrating agents, preferably lauryl captane. At lower temperatures, e.g., 120° C., or lower the reaction mixture is often too viscous for easy working. In addition, the reaction speed, which can be checked by following the rise in the solids content, is rather slow with many monomers. With high temperatures above, say, 180° C., low viscosity products are obtained even with purely thermal copolymerization. Especially with the use of α,β-ethylenically unsturated dicarboxylic acids or their anhydrides, it is preferred to carry out the polymerization merely by thermal action at 180–220° C. The reaction speed can be raised by adding cobalt (II) salts, e.g., cobalt (II) chloride in amounts of 3 to 6 p.p.m. The same reaction times are also obtained by the presence of stainless steel material. The reaction may also be effected in suitable solvents. Such solvents are water soluble solvents such as ethylene glycol, isopropylene glycol or butylene glycol. Also water non-diluable solvents, e.g., aromatic solvents, such as xylene, toluene or benzene can be used, but these must usually be removed after the termination of the reaction.

The viscosities of the reaction products should be between 95 and 800 cp., measured at 1:1 in butyl glycol at 20° C. This can be achieved either by a suitable choice of the monomer mixture, and by controlling the viscosity by the temperature and the use of suitable solvents. The viscosity can also be partially controlled by adding so-called controlling agents, as explained hereinbefore. The reaction products are transformed into their salts by adding ammonia and/or strong organic nitrogen bases, e.g., trimethyl amine, triethanol amine, triisopropanol amine, diglycol amine, diethyl amine, piperidine, morpholine, diethanol amine, n-dimethylethanol amine, n-methylethanol amine, etc. Strong organic nitrogen bases are secondary and tertiary amines, having in a 50% aqueous solution a pH value of at least 9. It is not necessary to neutralize the carboxyl groups of the reaction product completely, and it is sufficient to add such amounts of ammonia and/or amine that the products are diluable in water. Preferably, dilution in water is effected in the presence of so-called hydrophilic solvents. Such hydrophilic solvents are: ethers of ethylene glycol, such as ethyl glycol, isopropyl glycol, butyl glycol, also ethers of diethylene glycol, such as diethylene glycol diethyl ether, diethylene glycol dimethyl ether, as well as alcohols such as methanol, ethanol, propanols, butanols, sec.butanol, tert.butanol, as well as ketone alcohols such as diacetone alcohol.

The invention also relates to new, water diluable, vinyl modified synthetic resins based on polyetheresters such as obtained by the method of the invention.

The invention relates further to the use of the new polyetherester resins in water diluable binders or coating agents, either alone or in mixture with other binders, for stoving enamels. A preferred application of the new polyester resins is their use as sole binder or in mixture with other binders in electrophoretically depositable coatings. Another preferred embodiment is the use of the new resins as binders for air-drying coatings.

The binders used according to the invention may be pigmented or not and contain fillers or not. They may be applied, for example, to wood, concrete, brickwork, plaster, as well as steel and iron, non-ferrous metals, or without pre-treatment, galvanizing, tinplating or other metallizing processes, according to different methods, including electrophoretic application. Pigments and/or fillers are, for example and without thereby limiting the invention, red iron oxide, carbon black, lead silicochromate, micronized barytes, micro-talc, colloidal chalk, diatomaceous earth, China clay, titanium oxide, chromium oxide and the like.

The use of strong basic pigments such as zinc oxide, zinc chromate, lead carbonate, basic lead sulphate, minium or calcium plumbate requires exact examination. These pigments can tend to thicken or precipitate. The binding agents according to the present invention can be stoved at a raised temperature. On use as stoving lacquers the addition of water-soluble or at least hydrophilic, low molecular aldehyde condensation products, e.g. phenolic resoles and/or aminoplast-building condensation products can be advantageous. The mixture of the new water-soluble polyether with relatively low molecular at least hydrophilic, thermo-curable condensation products such as aminoplast-building reaction products and/or phenolic resoles and/or etherified phenolic resoles results in a higher cross-linking of the stoved coating agents and therefore in a further improvement in technical lacquer characteristics such as hardness, gloss, corrosion-protection and the like.

Heat hardening, hydrophilic condensation products also comprise such condensation products which, when heated, reach a comparatively high molecular, but not unmeltable, state. Neither is it absolutely essential that the admixed condensation products should, by themselves, be soluble in water. It is only necessary that their hydrophilic character should be sufficient to produce, in combination with possibly plastifying new water-soluble polyetherester acid resins, sufficient compatibility, i.e., stoved clear varnishes must be homogeneous and in aqueous coating, there must occur no separation of the binder components even when working in concentration.

Examples for suitable heat-setting, hydrophylic, low molecular condensation products are phenol alcohols and phenol polyalcohols, i.e., still low molecular condensation products of mono or multivalent phenols with aldehydes, such as formaldehyde, acetaldehyde, crotonaldehyde, acrolein, benzaldehyde, furfurol, etc., or compounds producing formaldehyde, such as paraformaldehyde, paraldehyde, trioxymethylene. Preferred is formaldehyde or a compound giving formaldehyde, such as produced by known methods in alkaline media, e.g., hexamethylene tetramine. Suitable phenols are phenol, phenols substituted in the o- o'-p-position, but adapted to be condensed with formaldehyde, such as cresol or xylenol. Very suitable are phenols, gained from alkyl phenols, such as propyl, butyl and especially p-tert.butyl phenol. Also resoles of binuclear phenols, such as diphenol and Bisphenol A, are suitable. Especially suitable are such resoles, based on Bisphenol A, which contain per mole Bisphenol A about 1.75 to 2.5 moles formaldehyde. It is also feasible to use as resoles phenolic resin carboxylic acids, produced by condensation of formaldehyde or compounds giving formaldehyde with suitable phenol carboxylic acids. Amongst the phenol carboxylic acids condensable with formaldehyde, 4,4-bis-(4-hydroxyphenyl)-valeric acid occupies a preferred position. Optimum results are obtained also here, if 1.75 to 2.5 moles formaldehyde are linked per mole phenolic carboxylic acid. The manufacture of other suitable phenolic carboxylic acid resoles is described in German published specification No. 1,113,775. The phenolic carboxylic acid resoles, especially those based on 4,4-bis-(4-hydroxyphenyl)-valeric acid, are very suitable for combination for the products according to the invention, intended for use as electrophoretically depositable coatings and varnish binders. Preferably at least a part of the formaldehyde condensation products are etherified with low monovalent aliphatic alcohols with 1 to 4 carbon atoms, such as ethanol, methanol, propanols, butanols. Preferred water-soluble phenolic resoles are such, which are obtained by reaction of alcohol-etherified phenol aldehyde condensation products with aliphatic monoxy or dioxycarboxylic acids or their esters, and described in Belgian patent application No. 67,005 of Dec. 4, 1968.

Thermosetting, hydrophilic, low molecular condensation products forming aminoplasts are aldehyde reaction products of such compounds which may be reacted with aldehydes, such as urea, ethylene urea, dicyandiamide, and aminotriazines such as melamine, benzoguanamine, acetoguanamine and formoguanamine. The pre-cited compounds may be recated with aldehyde, such as formaldehyde, acetaldehyde, crotonaldehyde, acrolein, benzaldehyde, furfurol and the like. Aldehydes also comprise aldehyde forming compounds, such as paraformaldehyde, paraldehyde and trioxymethylene. The preferred aldehyde is formaldehyde; preferred aldehyde-forming compounds are melamine and urea. The reaction is effected in the usual molar ratios of 1:1.5 to 1.4, with melamine resins in a formaldehyde molar ratio of 1:1.5 to 1:6. The condensation products forming aminoplasts are preferably used in partly or fully alkylated or alcohol modified form. Suitable were in this case also the etherification products of low molecular weight semi-ethers of glycol and diglycol, such as ethyl glycol, ethyl diglycol with methylol melamine, such as described already in Austrian Pat. No. 180,-407. Most preferred are low molecular weight condensation products of melamine with formaldehyde in a melamine-to-formaldehyde ratio of 1:4 to 1:6 and almost completely etherified with methanol. Also suitable are ethers of nitrogen-containing polymethylol compounds, partially esterified with dicarboxylic acids, such as obtained, e.g., by re-esterification of hexamethoxymelamine with adipic acid.

Particularly preferred are such water-diluable melamine resin condensation products as are obtained by reacting alcohol etherified aminotriazine formaldehyde condensation products, containing at least one mole of volatile alcohol radical in the ether bond, with aliphatic hydroxycarboxylic acid esters, by heating, and described in German patent application Nos. R 44,295, R 45,194 R 45,195, R 45,196 and R 45,852, available as priority documents to French Pat. No. 1,544,219.

Preferred are combinations with new polyetherester carboxylic acid resins, containing aminoplast forming or phenoplast forming condensation products with 10–30% w./w., related to the solid content.

For electrophoretic application it is preferred not merely to admix the thermosetting condensation products of the type hereinbefore described, i.e., phenoplasts and/or aminoplasts, to the resins prior to the neutralization, but to subject the components to a reaction. The reaction, which may be called a precondensation, is generally carried out at temperatures of 100° to 150° C., and a suitable reaction should be such that there occurs no esterification of the components, but an etherification. A suitable reaction consists, e.g., in reacting the components in the presence of an acid catalyst, such as phosphoric acids, p-toluene sulfonic acid, or benzoic acid, at temperatures between 100° and 150° C. The heating is broken off immediately, when the acid number has dropped by about 10 units, compared with the initial acid number of the reaction mixture. This may be achieved preferably by using, as phenoplasts and/or aminoplastas, etherified, hydrophylic, thermosetting condensation products. In order to achieve a sufficient re-etherification, the reaction may conveniently be carried out in a vacuum.

The combined stoving enamels made from the resins according to this invention may be applied to objects by conventional methods; they are particularly suitable for painting sheet metals. Here, it is a special advantage of the paints that they may also be deposited by means of electrophoresis. The stoving may be carried out at temperatures of about 80–200, and preferably about 100 to 180° C. and, as a function of the stoving temperature, for periods of 10 to 80, and preferably about 20 to 60 minutes.

Possibly in all cases, the enamels may contain, as additional component, at least one additional resin, soluble in the enamel system, different from the polyesterether resin, usual with ordinary water-soluble stoving enamels; in making the choice in type and amount, the compatibility should be considered.

With the use of resin combination according to the invention as binders for stoving enamels, the addition of hydroxyl group containing compounds, especially hydroxyl group containing amines, preferably of polyamines, is favourable. In a particularly preferred embodiment, the coating agents according to the invention contain as strong organic nitrogen bases at least one compound with the general formula

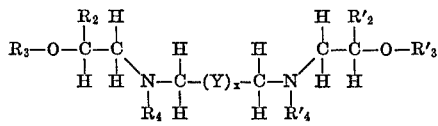

wherein the substituents and symbols mean the following:

$$Y = -CH_2-, -C_2H_4-, -C_3H_6-, -C_4H_8-, -CH_2-\overset{R_4}{\underset{|}{N}}-CH_2-$$

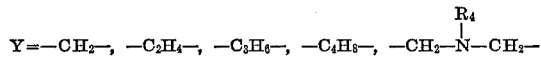

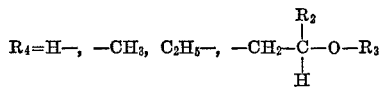

$$R_2 = H-, \quad CH_3-, \quad -C_2H_5$$

$$R'_2 = H-, \quad CH_3-, \quad -C_2H_5$$

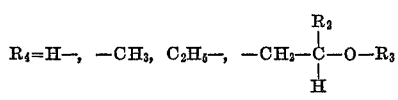

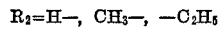

$x$ = zero or a whole number between 1 and 6; and $y$ = a whole number between 1 and 6.

Preferred are polyhydroxypolyamines according to the preceding general formula, characterized by the complete substitution of the hydrogen atoms of polyamines by the 2-hydroxypropyl radical, especially by the complete reaction of diethylene triamine and diethylene tetramine with propylene oxide, i.e., the resulting polyhydroxypolyamines. The manufacture of the preceding polyhydroxypolyamines is described in French Pat. No. 1,497,222.

The vinyl modified polyethers according to the invention may also be used for manufacturing air-drying varnishes and paints. In this case it is necessary to siccativate the paints. Suitable siccatives for the manufacture of paints are known cobalt, lead, manganese etc. compounds. Preferred are those which can be dispersed in water.

Air-drying varnishes may, and have practically always, an additional component in the form of at least one additional resin, soluble in the system, differing from the oxidatively drying carboxylic acid resin, usual with ordinary water-soluble, air-drying paints; the choice should take into consideration the compatibility, when choosing type and amount. Suitable additional resins are the water soluble resins according to U.S.A. Patent applications Ser. Nos. 758,566, 805,371, 859,189 and 864,876.

In many cases it has proved convenient to mix the water soluble, vinyl modified polyetherester carboxylic acid resins with dispersions based on styrene-butadiene copolymers, vinyl acetate, homopolymers, and vinyl acetate copolymers, as well as pure acrylate copolymers, either individually or in mixture. The quantity ratios between dispersion and coatings according to the invention may be 5–95 or 95–5% w./w.

A further embodiment of the described invention has now been found, in that water-dilutable synthetic resins may be manufactured which are characterized by extraordinary good quality of the film, good adhesion values, good potential resistance during electrophoretic application. These advantages are very important, because, when the method according to this invention is carried out in electrophoresis, film breakdowns may easily occur and the film resistance build-up is insufficient, unless precondensates are used.

This further embodiment relates to a method for manufacturing water-dilutable, vinyl modified synthetic resins based on polyetheresters, preferably for the manufacture of coating compounds for electrophoretic application according to this invention, characterized in that the solvents used in the reaction are substantially removed by distillation after the termination of the last reaction.

In a further embodiment of the first method described in this invention and in the second further embodiment, it has been found that the method in a further third embodiment may be carried out with particular advantage if the component (b), being a monovalent alcohol with 3–20 C atoms, containing at least one, and preferably several ethylenic double bonds, is allyloxypropanol. Allyloxypropanol is less toxic than allylalcohol. During the etherification of the epoxy group carrying compounds of stage (b) it is sufficient to use a small excess of allyloxypropanol (about 1.5 moles of allyloxypropanol per mole of epoxy group) without any risk of gelling. The non-reactive portion of allyloxypropanol may be easily removed by vacuum distillation.

Apart from that, the method used in this third modification is as described before.

EXAMPLE 1

520 g. of an epoxy resin produced, as known, by condensation of Bisphenol A with epichlorohydrin in an alkaline medium, having an epoxy equivalent weight of 450–525 and a softening point of 65–70° C. were dissolved in 800 g. allylalcohol. At 80° C., 100 g. of allylalcohol, containing 1 g. 40% BF$_3$ solution in diethyl ether was added. The solution was boiled under reflux for 1 hour and evaporated in a vacuum until no allylalcohol was obtained. 540 g. linoleic fatty acid were added. The mixture was heated to 200–230° C. until the acid number dropped to about 4 and towards the end a vacuum was applied. Then, at 150° C., a mixture of 380 g. styrene, 100 g. acrylic acid, 20 g. di-tert.-butyl peroxide and 20 g. laurylmercaptan were added in drops during three hours. Then the reaction mixture is held at 150° C. until the solid content reaches 95–96% w./w. Unreacted monomers are removed by vacuum distillation. The resin is diluted with butyl glycol to a solid content of 80% and may be diluted with water in any proportion after neutralization with amines.

The resin obtained in Example 1 is neutralized with concentrated ammonia solution and diluted with water to a solid content of 40% w./w. The solution is siccativated with cobalt siccative (Cyclodex), 0.1% w./w. cobalt, calculated on the solid resin. A film applied to a glass plate with a thickness of 90 microns is dust dry within 2 hours. In the pigmented state, the coating compound is suitable very well for corrosion primers and is characterised by excellent resistance to salt spray. The pH value of the solution is 9.0. After 21 days' storage at 50° C. the pH value was 8.8. The drying properties of the product did not change during that period.

The resin of Example 1 is mixed in the ratio of 7:3, related to the solid content, with the phenolic resin ether carboxylic acid described in the published documents of Belgium Pat. No. 724,923 (Application 67,005 of Dec. 4, 1968) Example 22. The manufacture of the phenolic resin carboxylic acid will be described in the following. The resin mixture is neutralized with triethylamine and diluted with water to a solid content of 40% w./w. The paste is ground in a ceramic ball mill with titanium dioxide Kronos RN 59 (Titangesellschaft) so that the ratio between pigment and binder is 0.5–1. Then the paste is diluted with water to a solid content of 10% w./w. The solution is placed in a steel basin, measuring 10 x 10 x 18 cm. and in this passivated steel plates (Bonder 1024 Metallgesellschaft) were coated by applying a D.C. voltage of 110 v. The plates were stoved for 30 min. at 170° C. and very hard and resistant layers are formed.

Manufacture of the etherified phenol resole:
  686.5 g. p.-tert.butylphenol resole are dehydrated in a vacuum at up to 90° C., then
  1650.0 g. n-butanol and
  835.0 g. toluene are added. The mixture is heated to boiling and the water is removed by azeotropic distillation, the solvent mixture being returned to the reaction vessel. After removal of about 40 g. water
  8.0 g. 85% phosphoric acid are added and the azeotropic distillation is continued until no water passes. Then, the acid is neutralized by calcium hydroxide added as a solid. The product is reduced in a vacuum at 110° C. and filtered. The solid content is about 92% w./w.

Manufacture of the phenolic resin carboxylic acid:
  340 g. of etherified phenol resole as described above, and 70 g. of dimethylol propionic acid are heated in a vacuum to 150–160° C., and are kept until about 100 g. of distillate (butanol) have been obtained. The product has then a viscosity of 150 cp., measured at 1:1 in butyl glycol at 20° C. and an acid number of 20.

The product is diluted to a solid content at 80% with isopropyl glycol. The neutralized resin may be diluted with water in any proportion and has a pH of 8.5.

EXAMPLE 2

(A) 370 g. of an epoxy resin with an epoxy equivalent weight of 370–440 and a softening point of 52–56° C., produces, as known, by reacting epichlorohydrin with Bisphenol A are dissolved in 600 g. allyl alcohol. At 80° C. 100 g. allyl alcohol, containing 1 g. of a 40% solution of borotrifluoride in ether are added. The solution is boiled for 1 hour under reflux and then evaporated in a vacuum until no allyl alcohol passes. 240 g. 70% linoleic acid are added, and the mixture is heated to 200–230° C., until the acid number has dropped to 5. The resin is then diluted with butyl glycol to a solids content of 80%; then a mixture of 290 g. styrene, 70 g. acrylic acid, 11 g. di-tert.-butyl peroxide and 16 g. laurylmercaptan are added in drops at 140° C. during 3 hours. The mixture is held at 140° C. until the solids content reaches about 85%. The solution is slightly reduced in a vacuum and diluted with butyl glycol to a solids content of 80%. After neutralization with amines, the resin may be diluted with water in any proportion.

(B) 160 g. of the resin of Example 2 are made, but the resin is not diluted with butyl glycol, as described there, but 43.5 g. of the etherified phenolic resole of Example 1 are added. 1 g. of a 40% isobutanol solution of 80% phosphoric acid are added and the mixture is heated in a vacuum to 140° C. and kept at this temperature until the acid number has reached a value of about 42 and the viscosity is 150 cp., measured at 1:1 in butyl glycol at 20° C. The resin is then diluted with diacetonalcohol to 80% and neutralized to a pH value of about 8 with diisopropanol amine. It is suitable as sole binder for electrophoretic painting.

(a) The resin combination described in Example 2B is neutralized with N,N,N',N',N" - pentakis - (2 - hydroxypropyl) - diethylene triamine instead of diisopropanol amine. The resin is well suited for sprayed primers and may be stoved in thick layers without splitting off.

(b) The resin combination described in Example 2B is neutralized with N,N,N',N',N",N" - hexakis - (2 - hydroxypropyl) - triethylene tetramine instead of diisopropanol amine. The resin is well suited for sprayed primers and may be stoved in thick layers without splitting off.

(c) The resin combination of Example 2B is neutralized with N,N,N',N'-tetrakis - (2 - hydroxypropyl)-ethylene diamine instead of diisopropanol amine. The resin is well suited for sprayed primers and may be stoved in thick layers without splitting off.

EXAMPLE 3

The procedure is as in Example 2A, but instead of the 70% linoleic acid, 200 g. isononanic acid are used. After the acid number has dropped to 4, 187 g. styrene, 47 g. acrylic acid, 7 g. di-tert.butyl peroxide and 7 g. laurylmercaptan are added in drops during 3 hours at 150° C. When the solids content reaches 97%, the unreacted monomers are removed by vacuum distillation. The resin is diluted with butyl glycol to a solid content of 80% and may be mixed with water in any proportion after neutralization with amines.

Manufacture of the anionic melamine resin:
  390 g. of hexamethoxymethyl malamine
  150 g. of n-butanol and
  140 g. of glycolic acid butyl ester Are mixed and 0.1 g. p-toluene sulphonic acid is added as catalyst. The mixture is heated to 100–110° C. until no distillate passes. Then vacuum is applied and the non-reacted portion of alcohol and ester is distilled off. Then, 100 ml. 5 N NaOH and 100 ml. water are added, followed by boiling under reflux for 1 hour. Then, the water is removed by azeotropic distillation, using benzol as entraining agent. Next, the benzol is distilled off in a vacuum and a solution of 30 g. oxalic acid in 100 g. acetone at 30° is added to the mixture. The whole is stirred and then filtered. The resin is neutralized with triethylamine. It is miscible with water to any degree and can be used for electrophoretic painting.

The resin obtained in Example 3 is mixed with an anionic melamine resin according to Example 9 as described in the published British Pat. No. 1,195,087 in the proportion of 8:2. As described in Example 1 of this invention, the mixture is pigmented and, also as described there, precipitated by electrophoresis. The plates are stoved for 30 min. Rather lustrous, hard coatings are obtained.

160 g. of the resin of Example 3 are prepared, but the resin is not diluted, as described there, with butyl glycol, but 40 g. hexamethoxymethyl melamine. Then, 0.1 g. toluene sulphonic acid are added and the mixture is heated in a vacuum to 120° C. When the acid number has dropped to 35, the resin is diluted with isopropyl glycol to a solid content of 80% and neutralized with diisopropanol amine. The resin is suitable for electrophoretic painting to produce light coatings.

EXAMPLE 4

A mixture of 300 g. of an epoxy resin with an equivalent epoxy weight between 1500 and 200 and a softening point (Durran) of 114–124° and 220 g. of an epoxy resin with an equivalent epoxy weight of 180–190 and a density of 1.15 to 1.17 at 25° C., both produced, as known, by condensation from Bisphenol A with epichlorohydrin in an alkaline medium, are dissolved in 800 g. allyl alcohol. The further processing is as in Example 1A, but the esterification product with the linseed oil fatty acid is diluted prior to the addition of the monomers with xylene to a solid content of 70 percent by weight. The monomers are then added during 3 hours at 140° C. When the solid content of the solution no longer rises, the xylene is removed by vacuum distillation until, at an internal temperature of 150° C. and a pressure of 12 torr, no distillate passes. Then, the resin is diluted with ethyl glycol to a solids content of 70 percent by weight. After its neutralization with aqueous ammonia solution and dilution with distilled water to a solids content of about 10 percent by weight, good films by good adhesion values are obtained with electrophoretic application.

The 70 percent solution of the resin of Example 4 is ground with a mixture of equal parts titanium dioxide RN 59 (Titangesellschaft) and aluminium silicate ASP 600 (Titangesellschaft) so that the pigment-to-binder ratio is 0.3:1. The pigment paste is neutralized with aqueous ammonia solution and the paste is then diluted with de-ionized water to a resin solid weight of 10 percent w./w. The solution is placed into a steel vessel 10 x 10 x 18 cm. In the same, zinc-phosphated steel plates (Bonder 125 Metallgesellschaft) are coated by applying a D.C. voltage of 120 volts.

The coated plates are rinsed with water and stoved for 30 min. at 170° C. Hardened, resistant coatings with good adhesion properties are obtained.

EXAMPLE 5

500 g. of an epoxy resin produced, as known, by condensation of Bisphenol A with epichlorohydrin in an alkaline medium, with an equivalent epoxy rate of 450–525 and a softening point of 65–75° C. are dissolved in 150 g. of allyloxypropanol. Then a solution of 1 g. of a 40 percent ether solution of boron trifluoride in 20 g. allyloxypropanol is added. The solution is heated for 1 hour under reflux, and the nonreacting allyloxypropanol is removed by vacuum distillation. 560 g. of tall oil fatty acid are added and the mixture is heated to 230–240° C. until the acid number has dropped below 5. The resin is diluted with xylene to a solids content of 50 percent w./w. and a mixture consisting of 350 g. 2-ethylhexyl acrylate, 150 g. of acrylic acid and 20 g. di-tert.-butyl peroxide are added in drops during 2.5 hours at 130° C. When the solid content of the reaction solution has reached 58 percent w./w., the xylene is removed by vacuum distillation. The resin is diluted with ethyl glycol to a solid content of 70 percent w./w. After neutralization with ammonia it is miscible with water in any proportion, and is particularly suitable as binder for electrophoretic paints.

EXAMPLE 6

The procedure is as in Example 1, however a mixture of 190 g. ethyl acrylate and 190 g. styrene is used instead of 380 g. styrene.

The resin is characterised in its use as air-drying lacquer by better gloss.

EXAMPLE 7

The procedure is as in Example 1, however a mixture of 200 g. ethyl acrylate and 180 g. butyl acrylate is used instead of 380 a styrene.

The resin is characterized when used as air-drying coating by wide flexibility and good drying qualities also in thick layers.

EXAMPLE 8

The procedure is as in Example 1, however a mixture of 200 g. styrene and 180 g. acrylonitrile is used in the copolymerisation instead of styrene. The addition of the monomer mixture takes place at the speed by which the reflux of the monomer mixture is not too strong. After all the monomer additions have been made and no more reflux exists, the reaction mixture is held for so long at 150° C. until the solids content has reached 98% by weight. The surplus monomers are then removed by vacuum distillation and the resin is diluted with ethyl glycol to a solids content of 80% by weight. The resin is characterized by the fact that after its neutralization with triethyl amine and dilution with water it can already be applied with a high solids content of approximately 55% by weight. The applied films are characterized by especially good drying qualities.

What is claimed is:

1. Method for manufacturing water-dilutable, vinyl modified synthetic resins based on polyetheresters, which comprises etherifying (a) a compound carrying epoxy groups and having the general formula

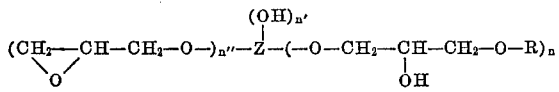

wherein R is an alkyl radical having 1 to 6 carbon atoms, (i) Z is a mono- or divalent hydrocarbyl radical, $n'$ is zero, $n''$ is 1, 2 or 3, and $n$ is zero, 1, or 2;

or (ii) Z is an alkylene, arylene or cycloalkylene radical and $n'$ and $n''$ have value 1, and $n$ is 0, 1, or 2;

or (iii) Z is a radical with the following formula

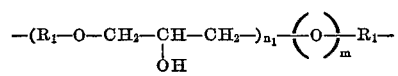

where $n$ and $n'$ are zero and $n''$ is 2, where $R_1$ is an aliphatic or aromatic radical, $n_1$ is zero or a small number between 1 and 5, and $m$ is zero or 1 with the proviso that when $n_1$ is zero $m$ is zero, and when $n_1$ is greater than zero $m$ is 1.

(b) monohydric aliphatic alcohol with 3–20 C atoms, having at least one double bond, by heating, esterifying (c) the etherification product with an aliphatic monocarboxylic acid having 6–20 C atoms, and (d) reacting the esterification product in the presence of an organic solvent with such amounts of a compound selected from the group consisting of an α,β-ethylenically unsaturated monocarboxylic acid, α,β-ethylenically unsaturated polycarboxylic acid, a corresponding anhydride, and semi-ester with a monohydric alcohol of 1 to 4 C atoms, by heating, in the presence of vinyl or vinylidene compounds or mixtures thereof, so that the reaction products have an acid number of at least 25, and (e) mixing the carboxyl group containing reaction product with such amounts of basic compounds selected from the group consisting of ammonia and strong organic nitrogen base up to complete or partial neutralization and until the reaction product is dispersible or water dilutable.

2. The method according to claim 1 characterized in that the epoxy group containing the hydroxyl group containing compounds used are polyethers of the general formula

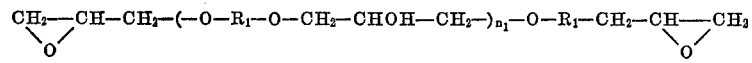

wherein $R_1$ is an aliphatic or aromatic hydrocarbon radical and $n_1$ is zero or a small number from 1 to 5.

3. The method according to claim 2, characterized in that polyethers of the general formula

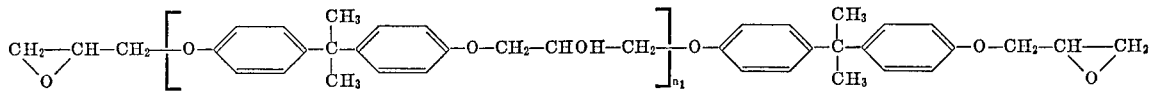

based on 2,2-bis-(4-hydroxy-phenyl)-propane as starting compound, are used, wherein $n_1$ is zero or a small number from 1 to 5.

4. The method according to claim 3, characterized in that polyethers with molecular weights between about 380 and 3500 are used.

5. The method according to claim 1 characterized in that for etherification, an alcohol having 3 to 20 C atoms is used in the presence of a catalyst.

6. The method according to claim 1, wherein in the etherification reaction the reaction components are used in such amounts that the hydroxyl groups of the unsaturated monohydric alcohols are in excess over the epoxy groups of the epoxy carrying compounds, and the excess of unreacted unsaturated alcohol is removed.

7. The method according to claim 1, wherein the etherification of the components (a) and (b) is effected at temperatures of about 40 to about 150° C., and reaction is interrupted while the formed etherification products are still soluble in organic solvents.

8. The method according to claim 1, wherein for the esterification of the polyether an aliphatic mono-carboxylic acid having 6 to 20 C-atoms is used.

9. The method according to claim 8 wherein the aliphatic mono-carboxylic acid is fatty acid, selected from the group consisting of branched saturated fatty acids, straight chain saturated fatty acids, straight chain unsaturated fatty acids having 10 to 20 carbon atoms, and mixtures thereof.

10. The method according to claim 8, characterized in that the aliphatic monocarboxylic acid is a member of the group consisting of a technical fatty acid, tall oil fatty acid, dehydrated castor oil fatty acids, catalytically-treated conjugated fatty acid, fatty acid from catalyticlly conjugated fats, fatty acid from conjugated linseed oil, fatty acid from conjugated soya oil, safflower oil fatty acids, catalytically elaidinated fatty acids, fatty acids from elaidinated fats, partially hydrogenated fatty acids, fatty acid from partially hydrogenated fats, fatty acid from partially hydrogenated fish oil, mixtures of fatty acids, fatty acid mixture containing as admixture a resin acid, fatty acid mixture containing a rosin, fatty acid mixture contaning a tall rosin acid, fatty acid mixture containing colophony and a partially hydrogenated rosin acid, fatty acid mixture containing partially hydrogenated colophony, and fatty acid mixture containing a partially hydrogenated rosin acid.

11. The method according to claim 8, wherein the aliphatic monocarboxylic acid used is technical linoleic acids produced by distillation and characterized by a linolic acid content over 50 weight percent, saturated fatty acid content below 10 weight percent, and a linolenic acid content below 2 weight percent.

12. The method according to claim 8 wherein the quantity of monocarboxylic acid is so chosen that the equivalency ratio between the carboxyl groups of the monocarboxylic acid to the hydroxyl groups of the epoxy resin ether is 0.5–0.9 and the esterification under heating is continued until the reaction product has an acid number of about 5.

13. The method according to claim 8 wherein the fatty acid is used in such quantities that the fatty acid content of the end product is in the range from 20 percent to 60 percent by weight.

14. The method according to claim 13 wherein the fatty acid content is in the range from 25 to 55 percent by weight.

15. The method according to claim 1 wherein in addition to the α,β-ethylenically unsaturated carboxylic acid, anhydride or semi-ester, a member of the group consisting of a vinyl compound or vinylidene compound, and mixtures thereof, is used in an amount and copolymerised for so long that the copolymerized quantity, related to the weight of the end product, is at least 10 percent by weight.

16. The method according to claim 1 wherein the polyetherester is copolymerised at an elevated temperature with an ethylenically unsaturated compound selected from the group consisting of a monocarboxylic acid, a polycarboxylic acid, and mixtures thereof.

17. The method according to claim 16 wherein the carboxylic-group-carrying copolymerisable monomers are selected from the group consisting of methacrylic acid, fumaric acid and maleic acid anhydride.

18. The method according to claim 1 wherein the copolymerization is carried out in a mixture of vinyl monomers with vinylidene monomers free from carboxylic groups.

19. The method according to claim 18 wherein the monomers are members of the group consisting of methacrylate, methylmethacrylate, ethylacrylate, ethylmethacrylate, propylacrylate, butylacrylate, octylacrylate, 2-ethylhexylacrylate, 2 - hydroxyethylacrylate, 2 - hydroxypropylacrylate, styrene, α-methyl styrene, vinyl toluene and mixtures thereof.

20. The method according to claim 1 wherein a member of the group consisting of acrylamide, methacrylamide, acrylnitrile, and methacrylnitrile is added to the monomer mixture.

21. The method according to claim 1 wherein as a strong organic nitrogen base is added at least one compound with the formula:

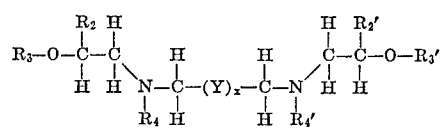

wherein the substituents and symbols have the following meaning:

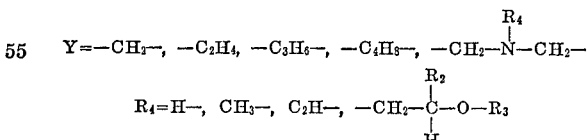

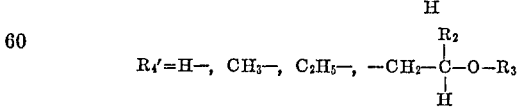

$R_2$=H—, $CH_3$—, $C_2H_5$—;

$R'_2$=H—, $CH_3$—, $C_2H_5$—;

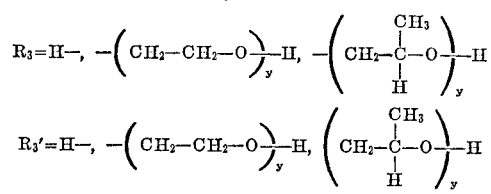

$x$ is zero or a whole number between 1 and 6, and $y$ is a whole number between 1 and 6.

22. The method according to claim 1 wherein the obtained product is mixed together with compounds selected from the group consisting of phenoplasts, aminoplasts, or mixtures thereof before neutralization with ammonia or amines and the resulting mixture is subjected to precondensation by heating to a temperature of from 100° to 150° C. and the heating of the mixture is interrupted when the formed precondensate has reached an acid number of at least 25.

23. The method for manufacturing water-dilutable, vinyl modified synthetic resins based on polyetheresters according to claim 1 wherein the solvent used in the reaction is substantially removed by distillation after the termination of the last reaction.

24. The method according to claim 1 wherein the monohydric aliphatic alcohol with 3-20 C atoms is allyloxypropanol.

25. An air-drying, water-dilutable vinyl modified synthetic resin prepared by the process according to claim 1.

26. A heat-curable vinyl modified synthetic resin prepared by the process according to claim 22.

27. A surface-coating composition whenever prepared by the process according to claim 1 comprising a water-dilutable vinyl modified synthetic resin either as sole binder or together with one or more other air-drying binders.

28. A surface-coating composition which comprises a synthetic resin as claimed in claim 27 as sole binder.

29. An air-drying water-dilutable vinyl modified synthetic resin prepared by the process according to claim 24.

30. The method according to claim 1 wherein the solvent used in Step (d) is selected from the group consisting of butylene glycol, ethylene glycol, and isopropylene glycol and which remains in the water-dilutable, vinyl modified synthetic resin after termination of the last reaction step.

31. An electrophoretic coating method which comprises applying electrophoretically in an aqueous suspension a coating of a water-dilutable vinyl modified synthetic resin produced according to the method claimed in claim 1 containing from 10 to 30 percent by weight of vinyl or vinylidene compounds or mixtures thereof in copolymerized form.

References Cited

UNITED STATES PATENTS

| | | | |
|---|---|---|---|
| 3,563,929 | 2/1971 | Guldenpfennig | 260—23 |
| 3,264,370 | 8/1966 | Ott et al. | 260—834 |
| 3,502,557 | 3/1970 | Yurcheshen et al. | 204—181 |
| 3,563,926 | 2/1971 | Lackner | 260—19 |
| 3,531,390 | 9/1970 | Le Bras | 204—181 |
| 3,362,899 | 1/1968 | Gilchrist | 204—181 |
| 3,369,983 | 2/1968 | Hart et al. | 204—181 |
| 3,410,926 | 11/1968 | Hicks | 260—834 |

FOREIGN PATENTS

| | | | |
|---|---|---|---|
| 1,497,222 | 10/1966 | France | 260—32.6 |

DONALD E. CZAJA, Primary Examiner

R. W. GRIFFIN, Assistant Examiner

U.S. Cl. X.R.

117—124 E, 132 BE, 161 UN, 161 ZB, 161 LN, Dig. 7; 204—181; 260—18 EP, 21, 23 TN, 23 EP, 24, 29.2 EP, 29.2 TN, 29.2 N, 29.3, 29.4 R

UNITED STATES PATENT OFFICE
CERTIFICATE OF CORRECTION

Patent No. 3,663,484    Dated May 16, 1972

Inventor(s) Dr. Bernhard Broecker    *1*

It is certified that error appears in the above-identified patent and that said Letters Patent are hereby corrected as shown below:

| PATENT READS: | APPLICATION READS: |
|---|---|
| Col. 1, line 45 "of" | Page 1, line 22 ---or--- |
| Col. 1, line 68 "gorups" | Page 2, line 7 ---groups--- |
| Col. 3, line 25 Formula | Page 4, lines 25-26 (amended under Rule 111 - 8/30/71) |

Patent reads:

Should read:
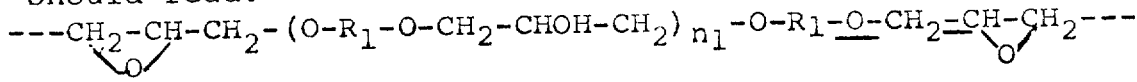

| | |
|---|---|
| Col. 4, line 40 "partciularly" | Page 6, line 23 ---particularly--- |
| Col. 6, lines 33-34 "unsturated" | Page 10, line 11 ---unsaturated--- |
| Col. 8, line 24 "recated" | Page 13, line 32 ---reacted--- | page 2

UNITED STATES PATENT OFFICE
CERTIFICATE OF CORRECTION

Patent No. 3,663,484      Dated May 16, 1972

Inventor(s) Dr. Bernhard Broecker

It is certified that error appears in the above-identified patent and that said Letters Patent are hereby corrected as shown below:

| | |
|---|---|
| Col. 12, line 50<br>"30°" | Page 22, line 10<br>---30° C.--- |
| Col. 13, line 18<br>"with" | Page 23, line 14<br>---by--- (see amendment under Rule 111 of August 30, 1971) |
| Col. 13, line 67<br>"380a" | Page 24, line 25<br>---380 g--- |
| Claim 1, before (b), insert ---with a--- | Amended under Rule 111 of August 30, 1971 |
| Claim 2, line 2<br>"the hydroxyl group" | Claim 2<br>---and hydroxyl group--- |
| Claim 10, line 5<br>"catalyticlly" | Claim 10<br>---catalytically--- |
| Claim 21<br>"Y=...-$C_2H_4$..." | Claim 21<br>---Y=...-$C_2H_4$=...--- |
| "$R_4$=...$C_2H$-..." | ---$R_4$=...$C_2\underline{H_5}$-...--- |
| "$R_3$'=...($CH_2$..." | ---$R_3$'=...=($CH_2$...--- |

Signed and sealed this 28th day of November 1972.

(SEAL)
Attest:

EDWARD M. FLETCHER, JR.
Attesting Officer

ROBERT GOTTSCHALK
Commissioner of Patents